United States Patent
Ito

(10) Patent No.: US 12,110,400 B2
(45) Date of Patent: Oct. 8, 2024

(54) INK DISCHARGING APPARATUS, INK HEATING METHOD, AND WATER-BASED INK FOR RECORDING

(71) Applicant: BROTHER KOGYO KABUSHIKI KAISHA, Nagoya (JP)

(72) Inventor: Shinpei Ito, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 28 days.

(21) Appl. No.: 17/545,017

(22) Filed: Dec. 8, 2021

(65) Prior Publication Data

US 2022/0089888 A1 Mar. 24, 2022

Related U.S. Application Data

(63) Continuation of application No. PCT/JP2020/023178, filed on Jun. 12, 2020.

(30) Foreign Application Priority Data

Jul. 10, 2019 (JP) .................................. 2019-128276

(51) Int. Cl.
   *C09D 11/107* (2014.01)
   *B41J 11/00* (2006.01)
   (Continued)

(52) U.S. Cl.
   CPC ....... *C09D 11/107* (2013.01); *B41J 11/00216* (2021.01); *B41M 5/0023* (2013.01); *C09D 11/322* (2013.01); *C09D 11/36* (2013.01)

(58) Field of Classification Search
   CPC ..... C09D 11/322; C09D 11/40; C09D 11/033; B41J 11/00216; B41J 11/0022; B41J 11/00222; B41J 2/01; B41J 2/14088
   See application file for complete search history.

(56) References Cited

U.S. PATENT DOCUMENTS

| 7,695,204 B2 * | 4/2010 | Silverbrook | B41J 15/165 400/208 |
| 9,205,680 B2 * | 12/2015 | Mackey | B65H 9/166 |

(Continued)

FOREIGN PATENT DOCUMENTS

| AU | 2017-202189 A1 | 3/2018 |
| EP | 3 249 021 A1 | 11/2017 |

(Continued)

OTHER PUBLICATIONS

Machine Translation of JP-2009197126-A; Produced by J-PlatPat [JPP] Jun. 10, 2023. (Year: 2023).*

(Continued)

*Primary Examiner* — John Zimmermann
(74) *Attorney, Agent, or Firm* — Merchant & Gould P.C.

(57) ABSTRACT

There is provided an ink discharging apparatus including: a conveyor, a head, a heater, and a controller. The controller is configured to control the conveyor and the heater so as to heat a recording medium or the water-based ink for recording adhered to the recording medium, while conveying the recording medium in a conveying direction. The water-based ink for recording includes: a resin-dispersed pigment, resin fine particles of which glass transition temperature is not less than 33° C., an organic solvent, and water. The ink discharging apparatus satisfies condition (I): 5≤(Tg−Th)≤40. In the condition (I), Tg (° C.) is the glass transition temperature of the resin fine particles, and Th (° C.) is a maximum surface temperature of the recording medium heated by the heater.

16 Claims, 4 Drawing Sheets

(51) Int. Cl.
*B41M 5/00* (2006.01)
*C09D 11/322* (2014.01)
*C09D 11/36* (2014.01)

(56) References Cited

U.S. PATENT DOCUMENTS

| | | | | |
|---|---|---|---|---|
| 11,919,292 | B2* | 3/2024 | Tanaka | B41J 11/00212 |
| 11,969,990 | B2* | 4/2024 | Okumura | C09D 11/033 |
| 2007/0197685 | A1* | 8/2007 | Aruga | C09D 11/322 |
| | | | | 523/160 |
| 2007/0281230 | A1* | 12/2007 | Miyake | G03G 7/0026 |
| | | | | 430/133 |
| 2010/0086692 | A1 | 4/2010 | Ohta | |
| 2010/0178425 | A1 | 7/2010 | Ooishi et al. | |
| 2011/0090279 | A1 | 4/2011 | Yanagi et al. | |
| 2013/0044169 | A1* | 2/2013 | Chiwata | B41J 11/0085 |
| | | | | 347/102 |
| 2015/0251452 | A1 | 9/2015 | Hatanaka et al. | |
| 2016/0101635 | A1 | 4/2016 | Hoshino et al. | |
| 2018/0086067 | A1 | 3/2018 | Mizutani | |
| 2018/0154670 | A1 | 6/2018 | Sano | |
| 2019/0300733 | A1* | 10/2019 | Takiguchi | B41M 5/5218 |
| 2019/0352524 | A1* | 11/2019 | Yatake | B41M 5/0023 |
| 2019/0381810 | A1* | 12/2019 | Takahashi | B41M 5/0011 |

FOREIGN PATENT DOCUMENTS

| | | |
|---|---|---|
| JP | 2001-212948 A | 8/2001 |
| JP | 2009-197126 A | 9/2009 |
| JP | 2010-90266 A | 4/2010 |
| JP | 2010-163534 A | 7/2010 |
| JP | 2011-83968 A | 4/2011 |
| JP | 2012-245721 A | 12/2012 |
| JP | 2015-107604 A | 6/2015 |
| JP | 2015-168114 A | 9/2015 |
| JP | 2015-174227 A | 10/2015 |
| JP | 2016-22683 A | 2/2016 |
| JP | 2016-78428 A | 5/2016 |
| JP | 2017-114123 A | 6/2017 |
| JP | 2017-155246 A | 9/2017 |
| JP | 2018-35295 A | 3/2018 |
| JP | 2018-51955 A | 4/2018 |
| JP | 2018-89926 | 6/2018 |
| JP | 2019-59878 A | 4/2019 |
| JP | 2019-93596 A | 6/2019 |

OTHER PUBLICATIONS

International Preliminary Report on Patentability and Written Opinion of the International Searching Authority issued in corresponding International Patent Application No. PCT/JP2020/023178, dated Jan. 11, 2022.
International Search Report issued in corresponding International Patent Application No. PCT/JP2020/02317, Aug. 25, 2020.
Office Action (Notice of Reasons for Refusal) issued in corresponding Japanese Patent Application No. 2019-128276, Feb. 21, 2023.
Office Action (Notice of Reasons for Rejection) issued in corresponding Japanese Patent Application No. 2019-128276, Jun. 27, 2023.
Office Action (Notice of Reasons for Rejection) issued in corresponding Japanese Patent Application No. 2019-128276, Oct. 17, 2023.
Notice of Decision of Refusal of corresponding Japanese Patent Application No. 2019-128276, Jan. 9, 2024.
Notice of Decision of Dismissal of Amendment of corresponding Japanese Patent Application No. 2019-128276, Jan. 9, 2024.

* cited by examiner

INK DISCHARGING APPARATUS, INK HEATING METHOD, AND WATER-BASED INK FOR RECORDING

CROSS REFERENCE TO RELATED APPLICATIONS

The present application is a Continuation Application of International Application No. PCT/JP2020/023178 filed on Jun. 12, 2020 claiming priority from Japanese Patent Application No. 2019-128276 filed on Jul. 10, 2019. The disclosures of International Application No. PCT/JP2020/023178 and Japanese Patent Application No. 2019-128276 are incorporated herein by reference in their entireties.

The present disclosure relates to an ink discharging apparatus, an ink heating method, and a water-based ink for recording. More specifically, the present disclosure relates to an ink discharging apparatus provided with a mechanism which heats, by a heater, an ink discharged onto and adhered to a recording medium so as to fix the ink to the recording medium, an ink heating method (ink drying method) for fixing an ink discharged onto and adhered to a recording medium so as to fix the ink to the recording medium, and a water-based ink for recording which is suitable for being discharged onto and adhered to a recording medium and for being heated by a heater to be fixed to the recording medium.

BACKGROUND

There is known a printing apparatus wherein a recording medium to which an ink discharged from a nozzle of a printing head is adhered is heated by a heater so that the ink is fixed to the recording medium. In a case that printing using a water-based ink containing a pigment is performed on a low water-absorbing or non-water absorbing recording medium and that a printing surface of the recording medium for which the printing has been performed is rubbed or scratched, etc., it is problematic that the ink is removed or peeled off from the printing surface. Accordingly, it is desired that the ink is fixed to the recording medium in an ensured manner by a heating with a heater, etc. Further, there is also known a water-based ink including resin fine particles in order to improve the abrasion resistance with respect to the recording medium. However, in a case that the temperature of the recording medium on which the recording has been performed is increased by the heating with the heater, etc., there is such a problem that the density of the color (color density) of the ink is not satisfactory. Furthermore, in a case that the size of the heater is increased so as to quickly perform the heating of the recording medium by the heater, there is such a problem that the size of the apparatus becomes large.

SUMMARY

The present disclosure has been made in view of the above-described situation, and an object of the present disclosure is to provide an ink discharging apparatus which has an excellent abrasion resistance and an excellent color density of the recording medium after printing, while suppressing the size of the apparatus from becoming large.

According to a first aspect of the present disclosure, there is provided an ink discharging apparatus including: a conveyor configured to convey a recording medium in a conveying direction; a head configured to discharge the water-based ink for recording onto the recording medium conveyed by the conveyor; a heater which is located at downstream in the conveying direction of the head; and a controller configured to control the conveyor, the head and the heater. The controller is configured to control the conveyor and the heater so as to heat the recording medium or the water-based ink for recording adhered to the recording medium, while conveying the recording medium in the conveying direction. The water-based ink for recording includes: a resin-dispersed pigment, resin fine particles of which glass transition temperature is not less than 33° C. an organic solvent, and water. The ink discharging apparatus satisfies condition (I): $5 \leq (Tg-Th) \leq 40$. In the condition (I), $Tg$ (° C.) is the glass transition temperature of the resin fine particles, and $Th$ (° C.) is a maximum surface temperature of the recording medium heated by the heater.

According to a second aspect of the present disclosure, there is provided an ink heating method of fixing, to a recording medium, a water-based ink for recording, which is adhered to the recording medium. The ink heating method includes heating, by a heater, the recording medium or the water-based ink for recording adhered to the recording medium. The water-based ink for recording includes: a resin-dispersed pigment, resin fine particles of which glass transition temperature is not less than 33° C., an organic solvent and water. The ink heating method satisfies condition (I): $5 \leq (Tg-Th) \leq 40$. In the condition (I), $Tg$ (° C.) is the glass transition temperature of the resin fine particles, and $Th$ (° C.) is a maximum surface temperature of the recording medium heated by the heater.

According to a third aspect of the present disclosure, there is provided a water-based ink for recording including: a resin-dispersed pigment; resin fine particles of which glass transition temperature is not less than 33° C.; an organic solvent; and water. The water-based ink for recording discharged from a printing head is fixed to a recording medium in a state that the recording medium is heated by a heater so that the water-based ink for recording satisfies condition (I): $5 \leq (Tg-Th) \leq 40$. In the condition (I), $Tg$ (° C.) is the glass transition temperature of the resin fine particles, and $Th$ (° C.) is the maximum surface temperature of the recording medium heated by the heater.

DETAILED DESCRIPTION

Figure 1:
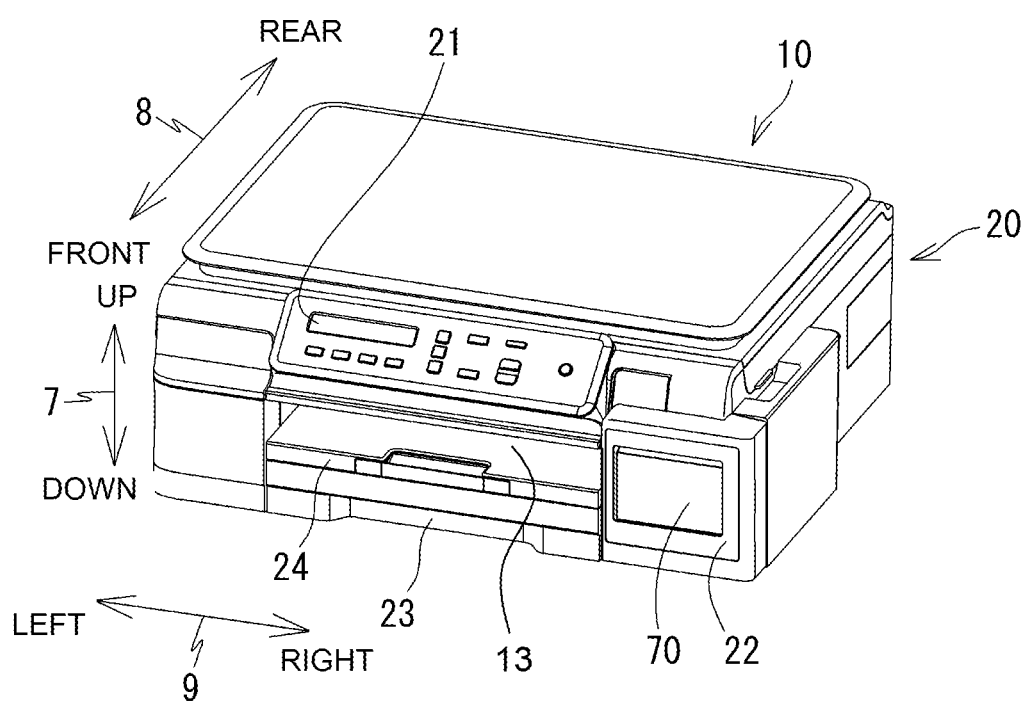
FIG. 1 is a perspective view of a printing apparatus.

In the following, a printing apparatus 10 (an example of an "ink discharging apparatus") according to an embodiment of the present disclosure will be explained. Note that the embodiment which is to be explained below is merely an example of the present disclosure; it is needless to say that the embodiment can be appropriately changed without changing the gist of the present disclosure. Further, in the following explanation, advancement or movement (progress) directed from a starting point to an end point of an arrow is expressed as an "orientation", and going forth and back on a line connecting the starting point and the end point of the arrow is expressed as a "direction". Further, in the following explanation, an up-down direction 7 is defined, with a state in which the printing apparatus 10 is installed usably (a state of FIG. 1), as the reference; a front-rear direction 8 (an example of a "first direction") is defined, with a side on which a discharge port 13 is provided is defined as a front side (front surface); and a left-right direction 9 (an example of a "second direction") is defined, with the printing apparatus 10 as seen from the front side (front surface). The front-rear direction 8 and the left-right direction 9 are orthogonal to each other.

[Outer Configuration of Printing Apparatus 10]

As depicted in FIG. 1, the printer 10 is provided with a casing 20; and a panel unit 21, a cover 22, a paper feed tray 23 and a paper discharge tray 24 which are held by the casing 20. The printer 10 records an image on a sheet 6 (see FIG. 2).

The sheet 6 is an example of a "recording medium". The sheet 6 may be a recording medium which is cut to a predetermined size, or may be a recording medium which is a sheet pulled from a roll formed of the sheet wound in a cylindrical tube shape, or may be a recording medium of fan-fold type. Further, the sheet 6 may be plain paper, or coated paper (coated paper sheet). The term "coated paper" means high quality printing paper, medium quality printing paper, etc., which is plain paper having a pulp as a constituent element thereof and having a coating agent applied thereon for a purpose of improving the smoothness, whiteness, glossiness, etc.; specifically, the coated paper is exemplified by high quality coated paper, medium quality coated paper, etc. Although the printing apparatus 10 is suitably usable for ink-jet recording on the coated paper, the usage of the printing apparatus 10 is not limited to the recording on the coated paper; it is possible to use the printing apparatus 10 also for ink-jet recording with respect to a recording medium which is different from the coated paper and which includes, for example, plain paper, glossy paper, mat paper, synthetic paper, cardboard (paperboard), corrugated cardboard, film, etc. Further, the sheet 6 may be a tack paper in which an adhesive and release paper are combined.

The panel unit 21 is provided with a touch panel and a plurality of operation switches. The panel unit 21 receives an operation by a user.

Figure 2:
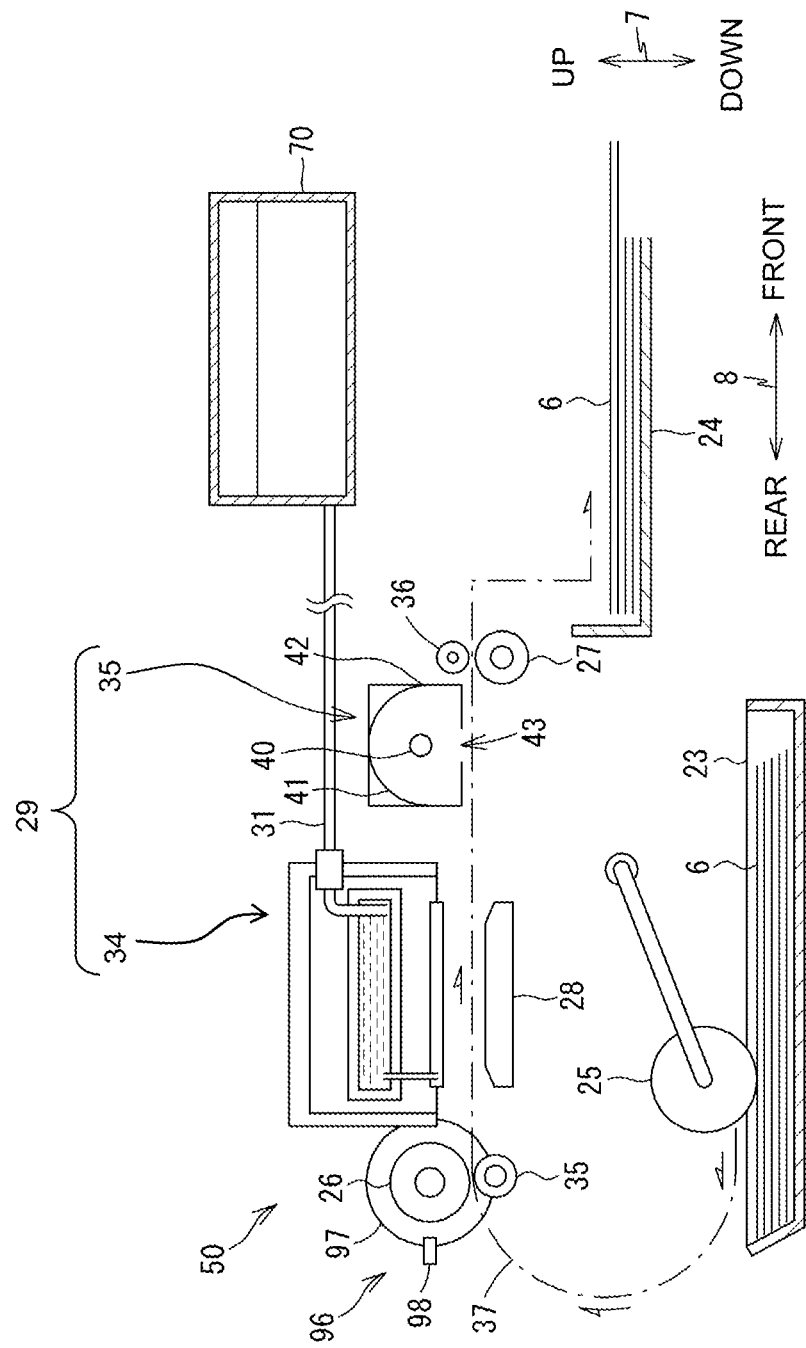
FIG. 2 is a schematic view depicting the internal configuration of the printing apparatus.

As depicted in FIG. 2, the paper feed tray 23 is positioned in a lower part of the casing 20. The paper discharge tray 24 is positioned in the lower part of the casing 20, at a location above the paper feed tray 23. The cover 22 is positioned in a right part of the front surface of the casing 20. The cover 22 is rotatable with respect to the casing 20. In a case that the cover 22 is opened, it is possible to access to a tank 70 storing an ink.

Note that although only one tank 70 is depicted in the present embodiment, the tank 70 is not limited or restricted by being a tank storing one color ink such as black, etc.; it is allowable, for example, that the tank 70 may be a tank having four storing chambers which store four color inks that are black, yellow, cyan and magenta, respectively.

As depicted in FIG. 2, the casing 20 holds a printing engine 50 in the inside of the casing 20. The printing engine 50 is mainly provided with a paper feeding roller 25, a conveying roller 26, a discharging roller 27, a platen 28 and a recording unit 29. The paper feeding roller 25 is held by a non-illustrated frame provided in the inside of the casing 20 so that the paper feeding roller 25 is capable of making contact with the sheet 6 placed in the paper feed tray 23. The paper feeding roller 25 is rotated by a non-illustrated motor. The paper feeding roller 25 which is (being) rotated feeds the sheet 6 to a conveying path 37. The conveying path 37 is a space defined by a non-illustrated guide member. In the example depicted in the drawing, the conveying path 37 is curved and extends from a rear end of the paper feed tray 23 up to a position above the paper feed tray 23, and then extends frontward. The paper feeding roller 25, the conveying roller 26 and the discharging roller 27 are an example of a "conveyor (conveying mechanism)".

The conveying roller 26 is located at the downstream, in the conveying orientation of the sheet 6, of the paper feed tray 23. The conveying roller 26 constructs a roller pair together with a driven roller 35. The conveying roller 26 is rotated by a non-illustrated motor. The conveying roller 26 and the driven roller 35 which are (being) rotated convey the sheet 6 fed to the conveying path 37 by the paper feeding roller 25, while pinching or holding the sheet 6 between the conveying roller 26 and driven roller 35. The discharging roller 27 is located at downstream, in the conveying orientation of the sheet 6, of the conveying roller 26. The discharging roller 27 constructs a roller pair together with a driven roller 36. The discharging roller 27 is driven by a non-illustrated motor. The discharging roller 27 and the driven roller 36 which are (being) rotated convey the sheet 6 and discharge the sheet 6 to the paper discharge tray 24, while pinching or holding the sheet 6 between the discharging roller 27 and driven roller 36. The platen 28 is positioned between the conveying roller 26 and the discharging roller 27 in the front-rear direction 8, at the downstream, in the conveying orientation of the sheet 6, of the conveying roller 26 and at the upstream, in the conveying orientation of the sheet 6, of the discharging roller 27.

In the present specification, a direction along the conveying path 37 in which the sheet 6 is conveyed is referred to as a "conveying direction". The sheet 6 is conveyed from the paper feed tray 23 to the paper discharge tray 24 along the conveying path 37. Namely, an orientation from the paper feed tray 23 toward the paper discharge tray 24 along the conveying path 37 is referred to as an "conveying orientation". In the conveying path 37, a side closer to the paper feed tray 23 is referred to as an "upstream in the conveying direction" or an "upstream in the conveying orientation". Further, in the conveying path 37, a side closer to the paper discharge tray 24 is referred to as a "downstream in the conveying direction" or a "downstream in the conveying orientation". The conveying roller 26 is provided with a rotary encoder 96. The rotary encoder 96 is an example of a "speed sensor". The rotary encoder 96 has an encoder disc 97 and an optical sensor 98. The encoder disc 97 is provided coaxially with the conveying roller 26, and rotates together with the conveying roller 26. The encoder disc 97 has a plurality of indexes. They are two kinds of indexes of which transmittance are mutually different. In the encoder disc 97, the two kinds of indexes are arranged alternately in the entire circumference in the circumferential direction of the encoder disc 97. The optical sensor 98 is capable of optically reading the two kinds of indexes of the encoder disc 97. By the reading, by the optical sensor 98, of the two kinds of indexes of the encoder disc 97 which is rotating, two kinds of signals are outputted in a pulsed shape from the optical sensor 98. The output signals from the optical sensor 98 are received by a controller which is to be described later on so as to determine a rotating speed of the conveying roller 26.

The recording unit 29 has a printing head 34 and a heater 35. The printing head 34 is positioned, in the front-rear direction 8, between the conveying roller 26 and the discharging roller 27. The printing head 34 may be a so-called serial head, or may be a so-called line head. The printing head 34 has a channel in which the ink flows and which is formed in the inside of the printing head 34. This channel is communicated with the tank 70 by a tube 31. Namely, the ink(s) stored by the tank 70 is (are) supplied to the printing head 34 via the tube 31.

The platen 28 is positioned at a location below the printing head 34. An upper surface of the platen 28 is a supporting surface of the sheet 6. Although not depicted in the respective drawings, an opening in which a suction pressure is generated is formed in the upper surface of the platen 28. By the suction pressure generated in the upper surface of the platen 28, the sheet 6 makes a tight contact with the upper surface of the platen 28.

Figure 3:
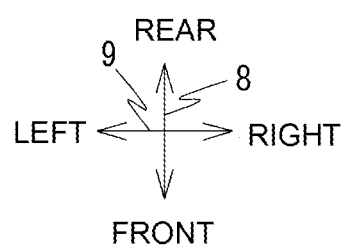
FIG. 3 is a schematic view of a heater, as seen from thereabove.
Figure 3:
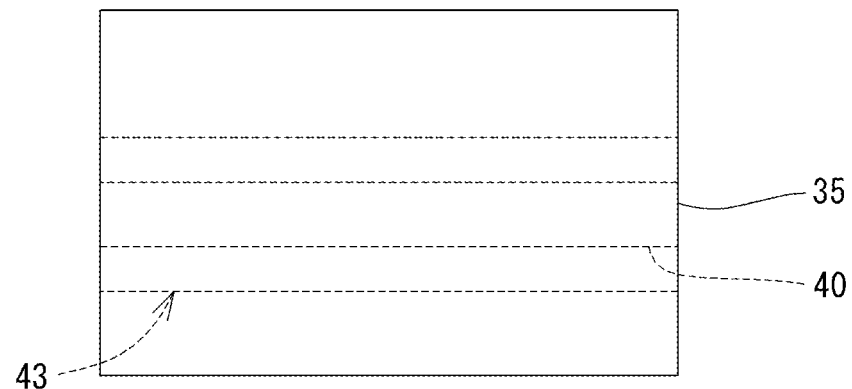

As depicted in FIGS. 2 and 3, the heater 35 is positioned at a location above the conveying path 37, at the downstream in the conveying direction of the printing head 34, and at the upstream of the discharging roller 27. The heater 35 is a so-called halogen heater, a dryer which performs a hot-air drying, etc.

As depicted in FIG. 2, the heater 35 is positioned at the downstream in the conveying orientation of the printing head 24, namely, positioned in front of the printing head 24. The heater 35 has a halogen lamp 40 which is a heating element and which radiates an infrared light, a reflective plate 41 and a casing 42. The casing 42 has a shape of substantially rectangular parallelepiped, and is opened downward. An opening 43 is positioned in a lower wall of the casing 42. Via the opening 43, the heat from the halogen lamp 40 and/or the reflective plate 41 is/are radiated to the outside and is shielded.

The halogen lamp 40 is positioned in an internal space of the casing 42. The halogen lamp 40 has a shape of a slender cylindrical tube of which longitudinal direction is the left-right direction 9. In the internal space of the casing 42, the reflective plate 41 is positioned at a location above the halogen lamp 40. The reflective plate 41 is a metallic plate coated with a ceramic film, etc., and is curved in an arc shape with the vicinity of the opening 43 as the central axis. Note that it is allowable to use a halogen lamp 40 coated with a ceramic film, etc., instead of using the reflective plate 41.

The heater 35 heats and dries at least one of the sheet 6 which is passing through the location below the opening 43 and the ink adhered to the sheet 6. In the present embodiment, the heater 35 heats both of the sheet 6 and the ink. By heating the ink, the resin fine particles undergo the glass transition, and by allowing the sheet 6 having passed the location below the heater 35 to be cooled, the resin which has undergone the glass transition is cured. With this, the ink is fixed to the sheet 6.

In view of the demand of miniaturization, in a case that the heater 35 is a halogen heater, the power consumption of the heater 35 is preferably not more than 600 W, more preferably not more than 400 W, particularly preferably not more than 200 W. Further, in a case that the heater 35 is a drier which performs the hot-air drying, the power consumption of the heater 35 is preferably not more than 2000 W, more preferably not more than 1400 W, particularly preferably not more than 1000 W. The power consumption of the heater 35 relates to a maximum surface temperature (Th, ° C.) in a case that the sheet 6 is heated by the heater 35. The maximum surface temperature (Th) is a maximum temperature to which the surface temperature of the sheet 6 reaches in a case that the heater 35 is driven in accordance with the power consumption and that the sheet 6 moving at the location below the heater 35 is moved at a constant conveying speed.

As depicted in FIG. 3, in view of the demand for the miniaturization, an irradiation length L, of the heater 35, which is along the left-right direction 9 (an example of a "width direction", an example of a "second direction"), namely, the length L of a range in which the halogen lamp 40 and the opening 43 overlap with each other and along the left-right direction 9 is preferably not more than 50 cm, more preferably not more than 30 cm, particularly preferably not more than 15 cm.

Note that the heater 35 is not limited to the halogen heater, provided that the heater 35 is a heater which is capable of heating the sheet or the ink. For example, the heater 35 may be a carbon heater, a dryer, an oven, a belt conveyor oven, etc.

For example, in a case that the heater 35 is a device such as a dryer which blows or blasts a hot air to the sheet 6, and that the wind speed of the heater 35 is too small, there is such a fear that the drying of the water-based ink adhered to the sheet 6 might be insufficient. In view of this, although it is allowable that the wind speed of the hot air blown from the heater 35 toward the sheet 6 is not less than 2 m/second, the wind speed is preferably not less than 3 m/second, more preferably not less than 4 m/second, particularly preferably not less than 5 m/second. On the other hand, in a case that the wind speed of the heater 35 is too great, there is such a fear that a coated film of the water-based ink formed in the sheet 6 and/or the sheet 6 might be deformed. Accordingly, the wind speed of the hot air blown from the heater 35 to the sheet 6 is preferably not more than 20 m/second, more preferably not more than 15 m/second, particularly preferably not more than 12 m/second. Note that the wind speed of the heater 35 is a wind speed on the surface of the sheet 6.

Figure 4:
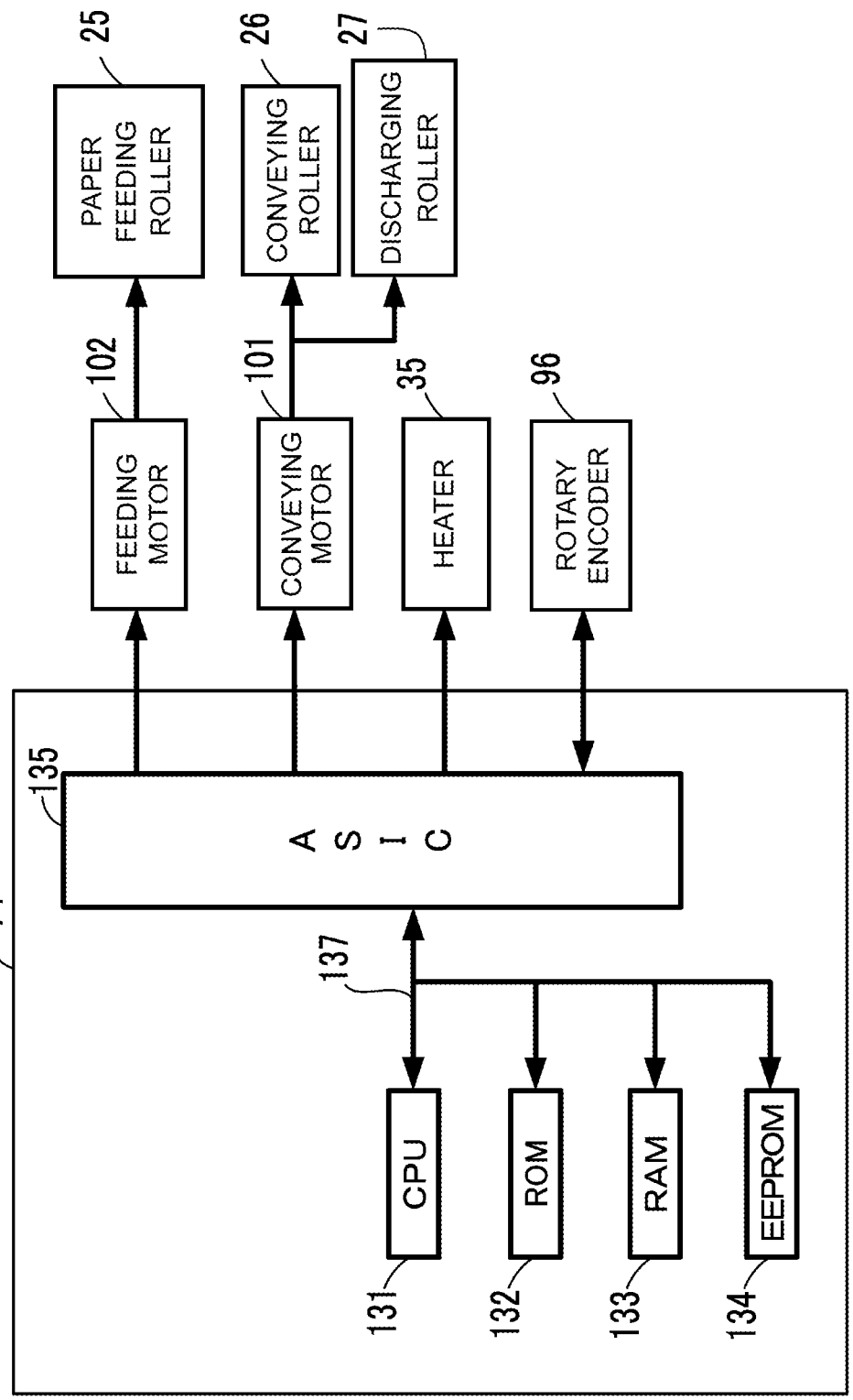
FIG. 4 is a block diagram of a controller.

As depicted in FIG. 4, a controller 74 and an electric power circuit (not depicted in the drawings) are arranged in the internal space of the casing 20. The controller 74 is constructed by connecting a CPU 31, a ROM 132, a RAM 133, an EEPROM 134, an ASIC 135, etc., by a bus 137 to be capable of data communication. The CPU 131 executes a program stored in the ROM 132, and the ASIC 135 performs a specific function which is set, thereby controlling an operation of the printing apparatus 10.

Note that in the controller 74, it is allowable that only the CPU 131 performs respective kinds of processing, or that only the ASIC 135 performs the respective kinds of processings. Alternatively, it is allowable that a plurality of pieces of the CPU 131 are mounted on the controller 74 and that the plurality of pieces of the CPU 131 perform the respective processings in a sharing manner. Still alternatively, it is allowable that a plurality of pieces of the ASIC 135 are mounted on the controller 74 and that the plurality of pieces of the ASIC 135 perform the respective processings in a sharing manner.

The electric power circuit is a circuit constructed of a large capacity capacitor, etc. In the present embodiment, the electric power circuit is mounted on a substrate constructed of paper phenol, etc. The electric power circuit is a circuit performing the conversion of electric power for supplying the electricity to respective constituent components or parts provided on the printing apparatus 10.

For example, the electric power is supplied from the electric power circuit to a feeding motor 102 and a conveying motor 101, and the rotations of the respective motors 102 and 101 are transmitted to the paper feeding roller 25, the conveying roller 26 and the discharging roller 27. Further, the electric power is supplied from the electric power circuit to the heater 35.

The controller 74 controls the rotational speeds of the conveying roller 26 and the discharging roller 27 so that the maximum surface temperature (Th) of the sheet 6 at a position at which the sheet 6 faces the heater 35 (a facing position) is preferably in a range of not less than 40° C. to not more than 80° C., more preferably in a range of not less than 50° C. to not more than 70° C. Namely, the controller 74 controls a conveying speed of the sheet 6 at the location below the heater 35 (at the facing position at which the sheet 6 faces the heater 35). The conveying speed is preferably within a range of not less than 5 cm/second to not more than 100 cm/second, further preferably within a range of not less than 10 cm/second to not more than 70 cm/second, particularly preferably within a range of not less than 10 cm/second to not more than 40 cm/second. Note that as depicted in FIG. 2, the sheet 6 is conveyed along the front-rear direction 8 at the facing position facing the heater 35. Namely, at the facing position, the conveying direction of the sheet 6 is the front-rear direction 8 (an example of the first direction).

[Composition of Ink]

In the following, the ink (an example of a "water-based ink for recording") stored in the tank 70 will be explained in detail. The ink includes a resin-dispersed pigment (resin-dispersible pigment, resin dispersion type pigment), resin fine particles, an organic solvent and water.

The resin-dispersed pigment is dispersible in water by, for example, a resin for dispersing pigment (resin dispersant). The resin-dispersed pigment is not particularly limited, and is exemplified, for example, by carbon black, an inorganic pigment, an organic pigment, etc. The carbon black is exemplified, for example, by furnace black, lamp black, acetylene black, channel black, etc. The inorganic pigment is exemplified, for example, by titanium oxide, inorganic pigments based on iron oxide, inorganic pigments based on carbon black, etc. The organic pigment is exemplified, for example, by azo-pigments such as azo lake, insoluble azo-pigment, condensed azo-pigment, chelate azo-pigment, etc.; polycyclic pigments such as phthalocyanine pigment, perylene and perynon pigments, anthraquinone pigment, quinacridone pigment, dioxadine pigment, thioindigo pigment, isoindolinone pigment, quinophthalone pigment etc.; dye lake pigments such as basic dye type lake pigment, acid dye type lake pigment etc.; nitro pigment; nitroso pigment; aniline black daylight fluorescent pigment; and the like. Specific examples of resin-dispersed pigments other than those described above are exemplified, for example, by C. I. Pigment Blacks 1, 6, and 7; C. I. Pigment Yellows 1, 2, 3, 12, 13, 14, 15, 16, 17, 55, 74, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 221, 222, 224 and 238; C. I. Pigment Violets 19 and 196; C. I. Pigment Blues 1, 2, 3, 15, 15:1, 15:2, 15:3, 15:4, 16, 22 and 60; C. I. Pigment Greens 7 and 36; and a solid solution of any one of the above-described pigments; etc. Note that the ink may further include another pigment and another dye, etc., in addition to the resin-dispersed pigment. Further, note that it is allowable that the ink includes only the resin-dispersed pigment as the colorant, and that the ink does not contain another colorant (a pigment, a dye, etc.).

A pigment solid content amount of the resin-dispersed pigment (pigment solid component amount (P)) in the entire amount of the water-based ink is not particularly limited, and can be determined appropriately, for example, in accordance with a desired optical density or chromaticness, etc. For example, the pigment solid component amount (P) is preferably within a range of not less than 0.1% by mass to not more than 20.0% by mass, more preferably within a range of not less than 1.0% by mass to not more than 15.0% by mass, particularly preferably within a range of not less than 2.0% by mass to not more than 5.0% by mass. The pigment solid component amount (P) is a mass only of the pigment, and does not include the mass of the resin dispersant. Only one kind of the resin-dispersed pigment may be used singly, or two or more kinds of the resin-dispersed pigment may be used in combination.

As the resin fine particles, it is allowable to use, for example, resin fine particles including at least one of methacrylic acid and acrylic acid as a monomer; it is allowable to use, as the resin fine particles, for example, a commercially available product. It is allowable that the resin fine particles further include styrene, vinyl chloride, etc., as the monomer. The resin fine particles may be, for example, those included in a resin emulsion. The resin emulsion is composed, for example, of the resin fine particles and a dispersion medium (for example, water, etc.), wherein the resin fine particles are dispersed with respect to the dispersion medium within a range of a specific particle diameter, not being in a dissolved state. The resin fine particles included in the resin emulsion are exemplified, for example, by: fine particles of a resin based on acrylic acid, a resin based on maleate ester, a resin based on vinyl acetate, a resin based on carbonate, a resin based on polycarbonate, a resin based on styrene, a resin based on ethylene, a resin based on polyethylene, a resin based on propylene, a resin based on polypropylene, a resin based on urethane, a resin based on polyurethane, and a resin of copolymer of the above-described resins, etc.

The glass transition temperature (Tg) of the resin fine particles may be, for example, in a range of not less than 0° C. to not more than 120° C., in a range of not less than 15° C. to not more than 120° C., or in a range of not less than 33° C. to not more than 77° C. By using resin fine particles of which Tg is within the above-described range, it is possible to obtain a water-based ink which has an excellent abrasion resistance in the recording medium.

The glass transition temperature Tg of the resin fine particles can be measured, for example, as follows. A differential scanning calorimeter "EXSTAR (trade name) 6000" (manufactured by SEIKO INSTRUMENTS INC.) is used; a container which is made of aluminum and in which 5 mg of a sample is stored is set in the apparatus (the differential scanning calorimeter); and the temperature is increased from 20° C. up to 200° C. under an atmosphere of nitrogen and under a condition of a temperature increasing rate of 10° C./minute. Then, after maintaining the sample for 1 (one) minute at 200° C., the sample is cooled up to −20° C. at a cooling rate of −10° C./minute. Then, after further maintaining the sample for 1 (one) minute at −20° C., the temperature of is raised up to 200° C.' at the temperature increasing rate of 10° C./minute. By doing so, a DSC (Differential Scanning calorimetry) curve is obtained. Based on the obtained DSC curve, the point of inflection in the second temperature increasing process is defined as the glass transition temperature.

As the resin emulsion, for example, a commercially available product of resin emulsion may be used. The commercially available product of the resin emulsion is exemplified, for example, by "SUPERFLEX (SUPERFLEX is a registered trade mark of DAI-ICHI KOGYO SEIYAKU CO., LTD.) 870" (Tg: 71° C.), manufactured by DKS CO., LTD (DAI-ICHI KOGYO SEIYAKU CO., LTD.), "MOWINYL (MOWINYL is a registered trade mark of JAPAN COATING RESIN CO., LTD.) 6969D" (Tg: 77° C.), "MOWINYL (registered trade mark) DM774" (Tg: 33° C.) manufactured by JAPAN COATING RESIN CO., LTD.;

"KE-1062" (Tg: 112° C.) and "QE-1042" (Tg: 69° C.) manufactured by SEIKO PMC CORPORATION); and the like.

The average particle diameter (average particle size) of the resin fine particles is, for example, within a range of not less than 30 nm to not more than 200 nm. The average particle diameter can be measured, for example, by using a dynamic light scattering particle diameter distribution measuring apparatus "LB-550" manufactured by HORIBA, LTD., as an arithmetic average diameter.

The content amount (R) of the resin fine particles in the entire amount of the water-based ink is, for example, preferably within a range of not less than 0.1% by mass to not more than 30% by mass, more preferably within a range of not less than 0.5% by mass to not more than 20% by mass, particularly preferably within a range of not less than 2.0% by mass to not more than 8.0% by mass. One kind of the resin fine particles may be used singly, or two or more kinds of the resin fine particles may be used in combination. Further, a ratio P:R of the pigment solid component amount (P) of the resin-dispersed pigment to the content amount (R) of the resin fine particles in the entire amount of the water-based ink is, for example, preferably in a range of P:R=1:4 to 4:1, further preferably in a range of P:R=1:2 to 2:1, particularly preferably in a range of P:R=1:1 to 2:1.

The organic solvent includes an organic solvent, of which saturated vapor pressure at 20° C. is not less than 0.03 hPa (hereinafter referred to as a "specific organic solvent; an example of a "first organic solvent"), and the organic solvent does not include, in a predetermined content amount or more, an organic solvent, of which saturated vapor pressure at 20° C. is smaller than 0.01 hPa (hereinafter referred to as an "excludable organic solvent"; an example of a "second organic solvent").

The content amount (H) of the specific organic solvent in the entire amount of the water-based ink is, for example, preferably in a range of not less than 1% by mass to not more than 50% by mass, more preferably in a range of not less than 5% by mass to not more than 40% by mass, particularly preferably in a range of not less than 10% by mass to not more than 30% by mass. The content amount of the excludable organic solvent in the entire amount of the water-based ink is, for example, not more than 10% by mass, or less than 10% by mass and is preferably 0 (zero).

The specific organic solvent is exemplified, for example, by propylene glycol (vapor pressure at 20° C.: 0.11 hPa), ethylene glycol (vapor pressure at 20° C.: 0.07 hPa), 1,2-butanediol (vapor pressure at 20° C.: 0.03 hPa), propylene glycol propyl ether (vapor pressure at 20° C.: 2.20 hPa), dipropylene glycol propyl ether (vapor pressure at 20° C.: 0.1 hPa), diethylene glycol monobutyl ether (vapor pressure at 20° C.: 0.1 hPa), 1,6-hexanediol (vapor pressure at 20° C.: 0.7 hPa), etc., and propylene glycol or 1,2-butanediol is preferred. In a case that the specific organic solvent is propylene glycol or 1,2-butanediol, it is possible to obtain an ink which is excellent in the abrasion resistance of the recording medium.

The excludable organic solvent is exemplified, for example, by 86% glycerol (vapor pressure at 20° C.: not more than 0.001 hPa).

The organic solvent may include an organic solvent which is different from the specific organic solvent. The humectant which is different from the specific organic solvent is not particularly limited, and is exemplified, for example, by: glycerol, triethylene glycol, butylene glycol, dipropylene glycol, tripropylene glycol, thiodiglycol, trimethylol propane, trimethylol ethane, polyethylene glycol, polypropylene glycol, etc. One kind of these organic solvents may be used singly, or two or more kinds of the organic solvents may be used in combination.

The mass ratio of the specific organic solvent in the entire amount of the organic solvent is, for example, preferably not less than 50% by mass, more preferably not less than 80% by mass, particularly preferably 100% by mass.

The ink may further include a water-soluble organic solvent which is different from the organic solvent. The water-soluble organic solvent which is different from the humectant is exemplified, for example, by a penetrant which adjusts the drying velocity on the recording medium.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. One kind of the penetrant may be used singly, or two or more kinds of the penetrant may be used in combination.

The content amount of the penetrant in the entire amount of the ink is, for example, preferably in a range of not less than 0% by mass to not more than 20% by mass, more preferably in a range of not less than 0% by mass to not more than 15% by mass, or particularly preferably in a range of not less than 1% by mass to not more than 3% by mass.

The water is preferably ion-exchange water or purified water (pure water). A content amount (W) of the water with respect to the entire amount of the ink is, for example, preferably within a range of not less than 10% by mass to not more than 90% by mass, more preferably within a range of not less than 20% by mass to not more than 80% by mass. The content amount (W) of the water may be, for example, a balance of the other components.

The ink may further include a conventionally known additive, as necessary. The additive is exemplified, for example, by surfactants, pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

The ink can be prepared, for example, by uniformly mixing the resin-dispersed pigment, the resin fine particles, the specific organic solvent and the water, and an optionally other additive(s) as necessary, by a conventionally known method, and then removing any non-dissolved matter, with a filter, etc.

[Operation of Printing Apparatus 10]

In the following, an operation of image recording by the printing apparatus 10 will be explained, with reference to FIG. 4.

In a case that the controller 74 receives print data, the controller 74 causes the paper feeding roller 25, the conveying roller 26 and the discharging roller 27 to rotate (rotate normally) so as to feed the sheet 6 to the location below the printing head 24.

The controller 74 controls the conveying roller 26 and the discharging roller 27 so as to convey the sheet 6 along the conveying direction from the upstream toward the downstream in the conveying direction (frontward in the front-rear direction 8). At the position facing the heater 35, the sheet 6 is conveyed frontward in the front-rear direction 8. Namely, at the position facing the heater 35, the conveying direction is the front-rear direction 8 (an example of the first direction). At the position facing the heater 35, the conveying speed of the sheet 6 is preferably within a range of not less than 5 cm/second to not more than 100 cm/second, more preferably within a range of not less than 10 cm/second to not more than 70 cm/second, particularly preferably within a range of not less than 10 cm/second to not more than 40 cm/second. The controller 74 controls the conveying speed of the sheet 6 so that the conveying speed of the sheet 6 is within the above-described range. Specifically, the controller 74 controls the conveying roller 26 and the discharging roller 27 so as to rotate the conveying roller 26 and the discharging roller 27 so that the conveying speed of the sheet 6 is within the above-described range. Such a control of the conveying speed is realized, for example, by performing control of the rotation of the conveying roller 26 based on the signals of the rotary encoder 96 provided on the conveying roller 26.

Further, the controller 74 turns on the power of the halogen lamp 40 of the heater 35. The maximum surface temperature (Th) of the sheet 6 brought about by the heating of the sheet 6 by the heater 35 is preferably within a range of not less than 40° C. to not more than 80° C., more preferably within a range of not less than 50° C. to not more than 70° C. Such a control of the maximum surface temperature (Th) of the sheet 6 is realized by a control of an electric power (W) supplied to the heater 35 and by a control of the rotating speed of the conveying roller 26 and the rotating speed of the discharging roller 27 which are performed by the controller 74. Further, the controller 74 causes the ink(s) to be discharged, based on the print data, from the printing head 34 toward the sheet 6, while causing the paper feeding roller 25, the conveying roller 26 and the discharging roller 27 to rotate (rotate normally).

The sheet 6 which is conveyed on the platen 28 toward the paper discharge tray 24 is moved toward the paper discharge tray 24, between the conveying roller 26 and the discharging roller 27, while being sucked by the upper surface of the platen 28. Ink droplets of the ink(s) discharged from the printing head 34 adhere to the sheet 6 which is supported by the upper surface of the platen 28. In a case that the sheet 6 to which the ink droplets are adhered reaches the location below the heater 35, the sheet 6 is heated by the heater 35. The ink droplets are fixed to the sheet 6 by the heating performed by the heater 35.

In a case that the controller 74 determines that the printing based on the print data is ended, then in accordance with this determination, the controller 74 conveys the sheet 6 until the sheet 6 is discharged to the paper discharge tray 24, then the controller 74 stops the paper feeding roller 25, the conveying roller 26 and the discharging roller 27. Further, the controller 74 turns off the power of the halogen lamp 40 of the heater 35.

By making the glass transition temperature Tg (° C.) of the resin fine particles included the ink to be within a range of not less than 33° C. to not more than 77° C., and by making a difference between the glass transition temperature Tg (° C.) of the resin fine particles included in the ink and the maximum surface temperature Th (° C.) of the sheet 6 heated by the heater 35 to satisfy the following condition (I), condition (II) or condition (III), then the resin fine particles are melted so as to form a film which has an appropriate thickness and which covers the pigment included in the ink. It is presumed that the abrasion resistance (friction resistance) of the ink is improved by making the strength of this film to be high. Further, since the thickness of this film becomes uniform, it is presumed that the glossiness of the ink in the sheet after printer is improved. It is also presumed that the abrasion resistance of the ink is improved.

$$5 \leq (Tg - Th) \leq 40 \quad \text{Condition (I)}$$
$$10 \leq (Tg - Th) \leq 40 \quad \text{Condition (II)}$$
$$10 \leq (Tg - Th) \leq 35 \quad \text{Condition (III)}$$

As explained above, according to the present disclosure, an excellent abrasion resistance and an excellent color density of the recording medium after printing are provided while suppressing the size of the apparatus from becoming large.

EXAMPLES

In the following, Examples of the present disclosure are explained together with Comparative Examples. Note that the present disclosure is not limited to or restricted by Examples and Comparative Examples described below.

[Aqueous Pigment Dispersion]

Pure water (purified water) was added to 20% by mass of a pigment (carbon black) and 7% by mass of sodium hydroxide-neutralized product of styrene-acrylic acid copolymer (acid value: 175 mgKOH/g, molecular weight: 10000) so that the entire amount thereof was 100% by mass, followed by being agitated and mixed, and thus a mixture was obtained. The obtained mixture was placed in a wet sand mill charged with zirconia beads of which diameter was 0.3 mm, and was subjected to a dispersing process for 6 (six) hours. Afterwards, the zirconia beads were removed by a separator, and the mixture was filtrated through a cellulose acetate filter of which pore size was 3.0 μm. Thus, aqueous pigment dispersion (water pigment dispersion) A was obtained. Note that the styrene-acrylic acid copolymer is a water-soluble polymer which is generally used as a dispersant for pigment (pigment dispersant).

[Preparation of Water-Based Ink for Recording]

Components, which were included in Water-based Ink Composition which is indicated in TABLE 1 and which were different from the fine resin particles and the aqueous pigment dispersion A, were mixed uniformly or homogeneously; and thus an ink solvent was obtained. Subsequently, the resin fine particles were added to the ink solvent followed by being mixed uniformly and thus a mixture was obtained; then the aqueous pigment dispersion A was added to the obtained mixture so as to obtain a mixture of which entire amount was 100% by mass. After that, the obtained mixture was filtrated through a cellulose acetate membrane filter (pore size 3.00 μm) produced by TOYO ROSHI KAISHA, LTD., and thus each of water-based inks 1 to 7 indicated in TABLE 1 was obtained.

Resin fine particle A: "KE-1062" (Tg: 112° C.) manufactured by SEIKO PMC CORPORATION);

Resin fine particle B: MOWINYL (registered trade mark) 6969D" (Tg: 77° C.) manufactured by JAPAN COATING RESIN CO., LTD.

Resin fine particles C: "SUPERFLEX (registered trade mark) 870" (Tg: 71° C.), manufactured by DKS CO., LID (DAI-ICHI KOGYO SEIYAKU CO., LTD.)

Resin fine particles D: "QE-1042" (Tg: 69° C.) manufactured by SEIKO PMC CORPORATION);

Resin fine particle E: "MOWINYL (registered trade mark) DM774" (Tg: 33° C.) manufactured by JAPAN COATING RESIN CO., LTD.

Organic solvent: propylene glycol (vapor pressure at 20° C.: 0.11 hPa), glycerol (vapor pressure at 20° C.: not more than 0.001 hPa)

Surfactant: "OLFINE (registered trade mark of NISSHIN KAGAKU KOGYO KK) E1010" manufactured by NISSHIN KAGAKU KOGYO KK

TABLE 1

| Name of Ink | | Ink 1 | Ink 2 | Ink 3 | Ink 4 | Ink 5 | Ink 6 | Ink 7 |
|---|---|---|---|---|---|---|---|---|
| Colorant | Carbon black | 5.00 | 5.00 | 5.00 | 5.00 | 5.00 | 5.00 | 5.00 |
| Resin fine particles *1 | Resin fine particles A | 5.00 | — | — | — | — | — | — |
| | Resin fine particles B | — | 5.00 | — | — | — | — | — |
| | Resin fine particles C | — | — | 5.00 | — | — | — | — |
| | Resin fine particles D | — | — | — | 5.00 | — | 5.00 | 5.00 |
| | Resin fine particles E | — | — | — | — | 5.00 | — | — |
| Organic solvent | Propylene glycol | 15.00 | 15.00 | 15.00 | 15.00 | 15.00 | 25.00 | 15.00 |
| | Glycerol | — | — | — | — | — | — | 10.00 |
| Surfactant | OLFIN E1010 | 1.00 | 1.00 | 1.00 | 1.00 | 1.00 | 1.00 | 1.00 |
| Water | | balance | balance | balance | balance | balance | balance | balance |

*1: The numeral of the resin fine particles indicates a solid component amount of the resin fine particles.

In each of Examples 1 to 17 and Comparative Examples 1 to 5, one of the water-based inks 1 to 7 was used so as to perform the evaluations of the abrasion resistance and the color density by the following methods.

[Abrasion Resistance]

The water-based ink for recording of each of Examples 1 to 17 and Comparative Examples 1 to 5 was used to perform draw down on coated paper ("OK TOP COAT+ (registered trade mark of OH PAPER CO., LTD.)" produced by Oil PAPER CO., LID.) so that a thickness of the film became to be 6 μm, and thus an evaluation sample was obtained. In a case of the hot-air drying, a dryer to which a nozzle was attached ("Terbo Dry (a registered trade mark of PANASONIC CORPORATION) 1200 EH5211 manufactured by PANASONIC CORPORATION) was used to blow a hot air to the evaluation sample for 20 second in a thermostatic bath of which temperature was controller so that the maximum surface temperature Th of the coated paper was within a range of not less than 28° C. to not more than 80° C., thereby performing the drying of the evaluation sample. In a case of using an IR heater, the evaluation samples of Examples 16 and 17 were dried as described below. The evaluation samples were passed a location immediately below an IR heater "PROMO HANDY MINI (a registered trade mark of TOHKOH TRADE CO., LTD.) SIR-760" manufactured by TOHKOH TRADE CO., LTD., (heating length: 5 cm, power output: 600 W). In Examples 16, the evaluation sample was passed the location at a conveying speed (time) and an output of the halogen heater so that the maximum surface temperature Th of the coated paper was made to be 70° C. The evaluation sample of Examples 16 was passed the location for 0.3 second. In Examples 17, the evaluation sample was passed the location at a conveying speed (time) and an output of the halogen heater so that the maximum surface temperature Th of the coated paper was made to be 40° C. The evaluation sample of Examples 16 was passed the location for 0.1 second.

After the drying of the evaluation sample, a load of 2 kg was applied to a cotton swab made by JOHNSON & JOHNSON K.K., and the cotton swab was made to rub (scratch) the evaluation sample three times, thereby performing a rubbing (scratching) test of the evaluation sample. Regarding the evaluation sample for which the rubbing was performed, a blank paper part which is adjacent to an ink coated part coated with the ink was evaluated, by a visual inspection, based on the following criterion for evaluation. Note that the "rubbing" is a trace of rubbing which is visually recognizable in the ink coated part, and that the "dirtied part" is a trace of rubbing visually recognizable in the blank sheet part (a trace of the ink adhered to the cotton swab transferred to the black sheet part). The evaluation samples were classified into the following groups, based on the results of evaluation, and an evaluation sample receiving the result of "B" or higher was determined to be "passing" the evaluation.

<Criterion for Evaluation of Abrasion Resistance>

A: No rubbing or dirtied part (smudge) was present.

B: Although a rubbing was present, no dirtied part was present.

C: Both of a rubbing and a dirtied part were present.

[Color Density]

The optical density (OD value) at three locations of an evaluation sample which was obtained in a similar manner as described above was measured with a spectrophotometric colorimetry meter "SpectroEye (a registered trade mark of X-Rite, Incorporated)" (measurement condition: light source: $D_{50}$, field: 2°, ANSI T) manufactured by X-Rite, Incorporated. Afterwards, an average value of the measured optical densities (OD values) at the three locations was obtained, and the evaluation was performed based on the following measuring criterion. The evaluation samples were classified into the following groups, based on the results of evaluation, and an evaluation sample receiving the result of "B" or higher was determined to be "passing" the evaluation, <Criterion for Evaluation of Color Density>
A: not less than 2.1
B: in a range of not less than 2.0 to less than 2.1
C: less than 2.0

The results of evaluations of each of Examples 1 to 17 and Comparative Examples 1 to 5 are indicated in TABLE 2.

TABLE 2

| | Examples | 1 | 2 | 3 | 4 | 5 | 6 |
|---|---|---|---|---|---|---|---|
| | Name of Ink | Ink 4 | Ink 1 | Ink 1 | Ink 3 | Ink 4 | Ink 4 |
| | Tg (° C.) of Resin fine particles | 69 | 112 | 112 | 71 | 69 | 69 |
| Drying condition | Drying method | hot air | hot air | hot air | hot air | hot air | hot air |
| | Maximum surface temperature Th (° C.) | 30 | 75 | 80 | 40 | 40 | 50 |
| | Wind speed (m/s) | 10 | 10 | 10 | 10 | 10 | 10 |
| | Output of IR heater (W) | — | — | — | — | — | — |
| Condition Item of evaluation | Tg − Th (° C.) | 39 | 37 | 32 | 31 | 29 | 19 |
| | Abrasion resistance | B | B | A | A | A | A |
| | Optical density (OD value) | A | A | A | A | A | A |
| | | 2.14 | 2.14 | 2.15 | 2.11 | 2.15 | 2.11 |

| | Examples | 7 | 8 | 9 | 10 | 11 |
|---|---|---|---|---|---|---|
| | Name of Ink | Ink 2 | Ink 4 | Ink 4 | Ink 5 | Ink 4 |
| | Tg (° C.) of Resin fine particles | 77 | 69 | 69 | 33 | 69 |
| Drying condition | Drying method | hot air | hot air | hot air | hot air | hot air |
| | Maximum surface temperature Th (° C.) | 60 | 59 | 64 | 28 | 40 |
| | Wind speed (m/s) | 10 | 10 | 10 | 15 | 2 |
| | Output of IR heater (W) | — | — | — | — | — |
| Condition Item of evaluation | Tg − Th (° C.) | 17 | 10 | 5 | 5 | 29 |
| | Abrasion resistance | A | A | A | A | B |
| | Optical density (OD value) | A | A | B | B | A |
| | | 2.13 | 2.10 | 2.04 | 2.02 | 2.13 |

| | Examples | 12 | 13 | 14 | 15 | 16 | 17 |
|---|---|---|---|---|---|---|---|
| | Name of Ink | Ink 4 | Ink 4 | Ink 6 | Ink 7 | Ink 2 | Ink 4 |
| | Tg (° C.) of Resin fine particles | 69 | 69 | 69 | 69 | 77 | 69 |
| Drying condition | Drying method | hot air | hot air | hot air | hot air | IR | IR |
| | Maximum surface temperature Th (° C.) | 40 | 40 | 59 | 59 | 70 | 40 |
| | Wind speed (m/s) | 4 | 15 | 15 | 15 | — | — |
| | Output of IR heater (W) | — | — | — | — | 600 | 600 |
| Condition Item of evaluation | Tg − Th (° C.) | 29 | 29 | 10 | 10 | 7 | 29 |
| | Abrasion resistance | A | A | A | B | A | A |
| | Optical density (OD value) | A | A | A | A | B | A |
| | | 2.13 | 2.12 | 2.15 | 2.12 | 2.01 | 2.12 |

TABLE 2-continued

| Comparative Examples | | 1 | 2 | 3 | 4 | 5 |
|---|---|---|---|---|---|---|
| | Name of Ink | Ink 1 | Ink 2 | Ink 4 | Ink 3 | Ink 2 |
| | Tg (° C.) of Resin fine particles | 112 | 77 | 69 | 71 | 77 |
| Drying condition | Drying method | hot air | hot air | hot air | hot air | hot air |
| | Maximum surface temperature Th (° C.) | 70 | 35 | 65 | 70 | 80 |
| | Wind speed (m/s) | 10 | 10 | 10 | 10 | 10 |
| | Output of IR heater (W) | — | — | — | — | — |
| Condition Item of evaluation | Tg − Th (° C.) | 42 | 42 | 4 | 1 | −3 |
| | Abrasion resistance | C | C | A | A | A |
| | Optical density (OD value) | A | A | C | C | C |
| | | 2.15 | 2.17 | 1.94 | 1.88 | 1.92 |

As indicated in TABLE 2, in Examples 1 to 17, the evaluations of the abrasion resistance and the color density did not have any evaluations of "C", and the results of the evaluations were satisfactory. Further, each of Examples 1 to 8, 11 to 15 and 17 wherein (Tg–Th) satisfied the condition (II) had the evaluation of the optical density which was "A" and which was superior to those of Examples 9, 10 and 16. Further, each of Examples 3 to 8 and 12 wherein (Tg–Th) satisfied the condition (III) and the wind speed of the heater was in a range of not less than 4 m/second to not more than 11 m/second had the result of the evaluation of "A" both in the abrasion resistance and the optical density which was superior. Furthermore, Example 15 using Ink 7 including 10% by mass of glycerol of which vapor pressure at 20° C. was not more than 0.001 hPa had the result of evaluation of the abrasion resistance of "B", which was inferior to Example 14 of which condition was similar to that of Example 15 except for using Ink 6 not including glycerol and of which result of evaluation of the abrasion resistance of "A".

On the other hand, in Comparative Examples 1 and 2 in which (Tg–Th) was greater than 40 had the result of evaluation of the abrasion resistance of "C". Further, in each of Comparative Examples 3 to 5 in which (Tg–Th) was smaller than 5 had the result of evaluation of the color density of "C".

What is claimed is:

1. An ink discharging apparatus comprising:
a conveyor configured to convey a recording medium in a conveying direction;
a head configured to discharge a water-based ink for recording onto the recording medium conveyed by the conveyor;
a single heater which is located downstream of the head in the conveying direction; and
a controller configured to control the conveyor, the head and the heater so as to heat the recording medium or the water-based ink for recording adhered to the recording medium while conveying the recording medium in the conveying direction,
wherein the water-based ink for recording includes:
a resin-dispersed pigment;
resin fine particles of which glass transition temperature is not less than 33° C.;
an organic solvent; and
water, and
wherein the controller is configured to control a conveying speed of the conveyor and an output of the heater to satisfy the following condition (I):

$$5 \leq (Tg-Th) \leq 40, \quad \text{condition (I):}$$

in the condition (I),
Tg (° C.) being the glass transition temperature of the resin fine particles, and
Th (° C.) being a maximum surface temperature of the recording medium heated by the heater, and
wherein the organic solvent includes a first organic solvent and a second organic solvent, where the first organic solvent has a saturated vapor pressure at 20° C. not less than 0.03 hPa, and a content amount of the first organic solvent is not less than 10% by mass relative to an entire amount of the water-based ink for recording, and the second organic solvent has a saturated vapor pressure at 20° C. less than 0.01 hPa, with the content amount of the second organic solvent is less than 10% by mass relative to the entire amount of the water-based ink for recording.

2. The ink discharging apparatus according to claim 1, wherein the maximum surface temperature Th is in a range of 40° ° C. to 80° C.

3. The ink discharging apparatus according to claim 1, wherein the heater is configured to blow a hot air to the recording medium or the water-based ink for recording adhered to the recording medium, and
wherein the controller is configured to control the heater so as to heat the recording medium or the water-based ink for recording adhered to the recording medium by blowing the hot air of which wind speed on a surface of the recording medium is not less than 2 m/second.

4. The ink discharging apparatus according to claim 3, wherein the controller is configured to control the heater so as to heat the recording medium or the water-based ink for recording adhered to the recording medium by blowing the hot air of which wind speed on the surface of the recording medium is not less than 4 m/second.

5. The ink discharging apparatus according to claim 1, wherein the controller is configured to control the conveying speed of the conveyor and the output of the heater to satisfy the following condition (II):

$$10 \leq (Tg-Th) \leq 40, \quad \text{condition (II):}$$

in the condition (II),
Tg (° C.) being the glass transition temperature of the resin fine particles, and
Th (° C.) being the maximum surface temperature of the recording medium heated by the heater.

6. The ink discharging apparatus according to claim 1, wherein the controller is configured to control the conveying speed of the conveyor and the output of the heater to satisfy the following condition (III):

$$10 \leq (Tg-Th) \leq 35, \qquad \text{condition (III):}$$

in the condition (III),
Tg (° C.) being the glass transition temperature of the resin fine particles, and
Th (° C.) being the maximum surface temperature of the recording medium heated by the heater.

7. The ink discharging apparatus according to claim 1, wherein the heater is configured to radiate an infrared light to the recording medium or the water-based ink for recording adhered to the recording medium, and
wherein an electrical power consumption of the heater is not more than 600 W.

8. The ink discharging apparatus according to claim 7, wherein at a facing position at which the recording medium faces the heater, the conveying direction of the recording medium is a first direction, and
wherein an irradiation length, of the heater, in a second direction orthogonal to the first direction is not more than 50 cm.

9. The ink discharging apparatus according to claim 1, wherein the glass transition temperature Tg is in a range of 33° ° C. to 77° C.

10. The ink discharging apparatus according to claim 1, further comprising a casing which accommodates the conveyor, the head, the heater and the controller.

11. The ink discharging apparatus according to claim 1, wherein the controller is configured to control the conveyor so as to convey the recording medium at a conveying speed of the recording medium at a facing position at which the recording medium faces the heater, the conveying speed being in a range of 5 cm/second to 100 cm/second.

12. The ink discharging apparatus according to claim 1, wherein the heater is configured to blow a hot air to the recording medium or the water-based ink for recording adhered to the recording medium;
wherein the controller is configured to control the heater so as to heat the recording medium or the water-based ink for recording adhered to the recording medium by blowing the hot air of which wind speed on a surface of the recording medium is in a range of 4 m/second to 11 m/second; and
wherein the controller is configured to control the conveying speed of the conveyor and the output of the heater to satisfy the following condition (III):

$$10 \leq (Tg-Th) \leq 35, \qquad \text{condition (III):}$$

in the condition (III),
Tg (° C.) being the glass transition temperature of the resin fine particles, and
Th (° C.) being the maximum surface temperature of the recording medium heated by the heater.

13. The ink discharging apparatus according to claim 1, wherein the first organic solvent is propylene glycol.

14. The ink discharging apparatus according to claim 1, wherein the resin fine particles are included in a resin emulsion.

15. An ink heating method of fixing, to a recording medium which is conveyed by a conveyor, a water-based ink for recording, which has been adhered to the recording medium, the ink heating method comprising controlling a conveying speed of the conveyor and output of a heater which is heating the recording medium or the water-based ink for recording adhered to the recording medium,
wherein the water-based ink for recording includes:
a resin-dispersed pigment,
resin fine particles of which glass transition temperature is not less than 33° C.,
an organic solvent, and
water; and
the ink heating method satisfies the following condition (I):

$$5 \leq (Tg-Th) \leq 40, \qquad \text{condition (I):}$$

in the condition (I),
Tg (° C.) being the glass transition temperature of the resin fine particles, and
Th (° C.) being a maximum surface temperature of the recording medium heated by the heater, and
wherein the organic solvent includes a first organic solvent and a second organic solvent, where the first organic solvent has a saturated vapor pressure at 20° ° C. not less than 0.03 hPa, and a content amount of the first organic solvent is not less than 10% by mass relative to an entire amount of the water-based ink for recording, and the second organic solvent has a saturated vapor pressure at 20° C. less than 0.01 hPa, with the content amount of the second organic solvent is less than 10% by mass relative to the entire amount of the water-based ink for recording.

16. A water-based ink for recording comprising:
a resin-dispersed pigment;
resin fine particles of which glass transition temperature is not less than 33°C;
an organic solvent; and
water,
wherein the water-based ink for recording discharged from a printing head is fixed to a recording medium in a state that the recording medium is heated by a heater so that the water-based ink for recording satisfies the following condition (I):

$$5 \leq (Tg-Th) \leq 40, \qquad \text{condition (I):}$$

in the condition (I),
Tg (° C.) being the glass transition temperature of the resin fine particles, and
Th (° C.) being the maximum surface temperature of the recording medium heated by the heater,
wherein the organic solvent includes a first organic solvent of which saturated vapor pressure at 20° ° C. is not less than 0.03 hPa and a second organic solvent of which saturated vapor pressure at 20° C. is less than 0.01 hPa, and a content amount of the first organic solvent is not less than 10% by mass to an entire amount of the water-based ink for recording, and a content amount of the second organic solvent is not more than 10% by mass to the entire amount of the water-based ink for recording.

* * * * *

UNITED STATES PATENT AND TRADEMARK OFFICE
CERTIFICATE OF CORRECTION

| | |
|---|---|
| PATENT NO. | : 12,110,400 B2 |
| APPLICATION NO. | : 17/545017 |
| DATED | : October 8, 2024 |
| INVENTOR(S) | : Shinpei Ito |

It is certified that error appears in the above-identified patent and that said Letters Patent is hereby corrected as shown below:

In the Claims

Claim 2, Column 12, Line 47: Delete "40° °" and insert -- 40° -- therefor.

Claim 9, Column 19, Line 22: Delete "33° °" and insert -- 33° -- therefor.

Claim 15, Column 20, Line 27: Delete "20° °" and insert -- 20° -- therefor.

Claim 16, Column 20, Line 54: Delete "20° °" and insert -- 20° -- therefor.

Signed and Sealed this
Tenth Day of December, 2024

*Katherine Kelly Vidal*
Katherine Kelly Vidal
*Director of the United States Patent and Trademark Office*